Figure 1:
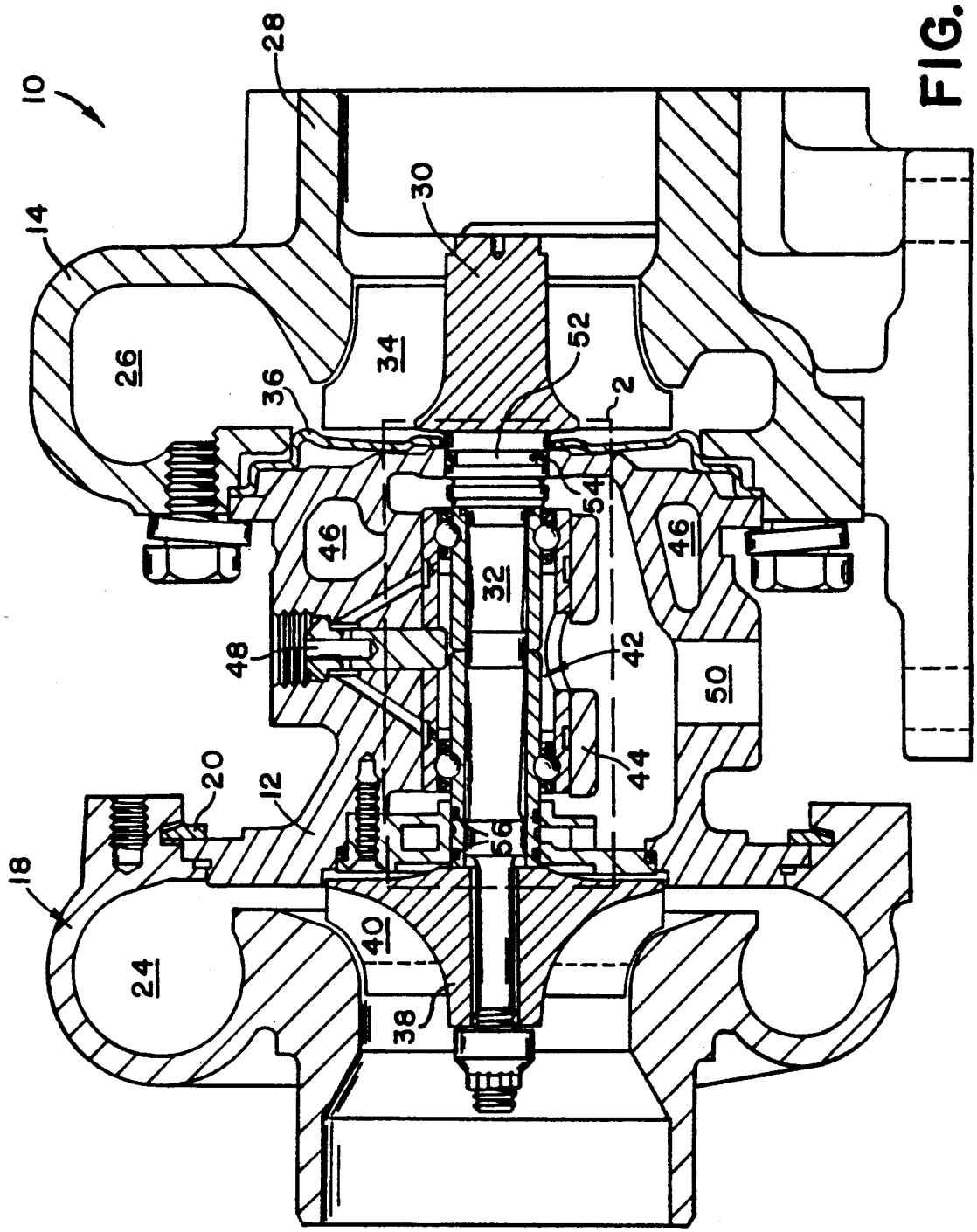

United States Patent [19]

Gutknecht

[11] Patent Number: 5,055,009
[45] Date of Patent: Oct. 8, 1991

[54] TURBOCHARGER WITH IMPROVED ROLLER BEARING SHAFT SUPPORT

[75] Inventor: Daniel A. Gutknecht, Torrance, Calif.

[73] Assignee: Allied-Signal Inc., Morristown, N.J.

[21] Appl. No.: 449,280

[22] Filed: Dec. 12, 1989

[51] Int. Cl.⁵ .............................................. F04B 17/00
[52] U.S. Cl. ..................................... 417/407; 384/476
[58] Field of Search .................. 417/407, 408, 409; 384/900, 493, 277, 278, 476, 99, 535, 585, 512, 506

[56] References Cited

U.S. PATENT DOCUMENTS

| | | | |
|---|---|---|---|
| 2,938,659 | 5/1960 | Judson et al. | 417/407 |
| 4,122,673 | 10/1978 | Leins | 417/407 |
| 4,573,808 | 3/1986 | Katayama | 384/900 |
| 4,652,219 | 3/1987 | McEachern, Jr. et al. | 417/407 |
| 4,798,523 | 1/1989 | Glaser et al. | 417/407 |
| 4,969,805 | 11/1990 | Romeo | 417/407 |

OTHER PUBLICATIONS

Miyashita et al., S.A.E. Technical Paper Series #870354, Development of High Efficiency Ball Bearing Turbocharger.

Primary Examiner—Louis J. Casaregola
Assistant Examiner—Timothy S. Thorpe
Attorney, Agent, or Firm—Ken C. Decker; William N. Antonis

[57] ABSTRACT

An exhaust gas driven turbocharger includes a housing, and a shaft rotatably supporting a compressor wheel and a turbine wheel for rotation within the housing. A cartridge ball bearing assembly supports the shaft for rotation relative to the housing and includes a bearing outer ring, a bearing inner ring, and roller bearing elements supporting the inner ring for rotation relative to the outer ring. The inner ring is mounted on the shaft by axially spaced faying surfaces, the length of which are controlled to minimize heat transfer from the shaft to the bearing assembly while assuring the necessary stiffness of the assembly.

9 Claims, 2 Drawing Sheets

TURBOCHARGER WITH IMPROVED ROLLER BEARING SHAFT SUPPORT

This invention relates to an automotive exhaust gas driven turbocharger.

In order to improve response, advanced turbocharger designs have proposed the use of rolling element bearings to support the shaft upon which the turbine wheel and compressor wheel are mounted. The inner rings of the bearings that support opposite ends of the shaft are mounted directly on the shaft to provide high radial stiffness and high bending stiffness of the rotor system. The large surface area between the bearing rings and the shaft results in an efficient heat transfer boundary which allows the bearing to reach temperatures very near that of the shaft itself. Since the shaft is directly connected to the turbine wheel which reaches a very high temperature because of the exhaust gas communicated through the turbine wheel, the bearing inner ring also reaches a very high temperature, particularly immediately after engine shutdown which discontinues the flow of relatively cool ambient air through the compressor section of the turbocharger and also discontinues the flow of lubricating oil through the bearing. Accordingly, water cooling has been Proposed to limit temperatures of the non-rotating parts after a hot shutdown, but heat transfer from the turbine wheel to the bearing inner rings results in very high bearing inner ring temperatures.

The foregoing difficulties can be overcome by the use of high temperature bearing steels and bearing systems with large clearances. High temperature bearing steels are quite costly, and bearing systems with large clearances, while they allow high temperature differentials between the bearing inner and outer rings without damage to the bearing, require preloading with complicated elastically sprung retention members. A representative bearing system with large clearances using elastically sprung members to provide bearing preload is disclosed in U.S. Pat. No. 4,652,219 and in U.S. Pat. No. 4,798,523.

The present invention allows the use of relatively lower cost grades of bearing materials, and also allows for the use of bearing systems with no elastic spring members, even on internal combustion engines developing relatively high exhaust temperature. The present invention uses a stepped shaft with corresponding differences of the inside diameter of the bearing inner ring. Accordingly, assembly of the bearing onto the shaft is facilitated, since clearance between the bearing and the shaft exists until the bearing is actually mounted in its final assembly position.

Figure 2:
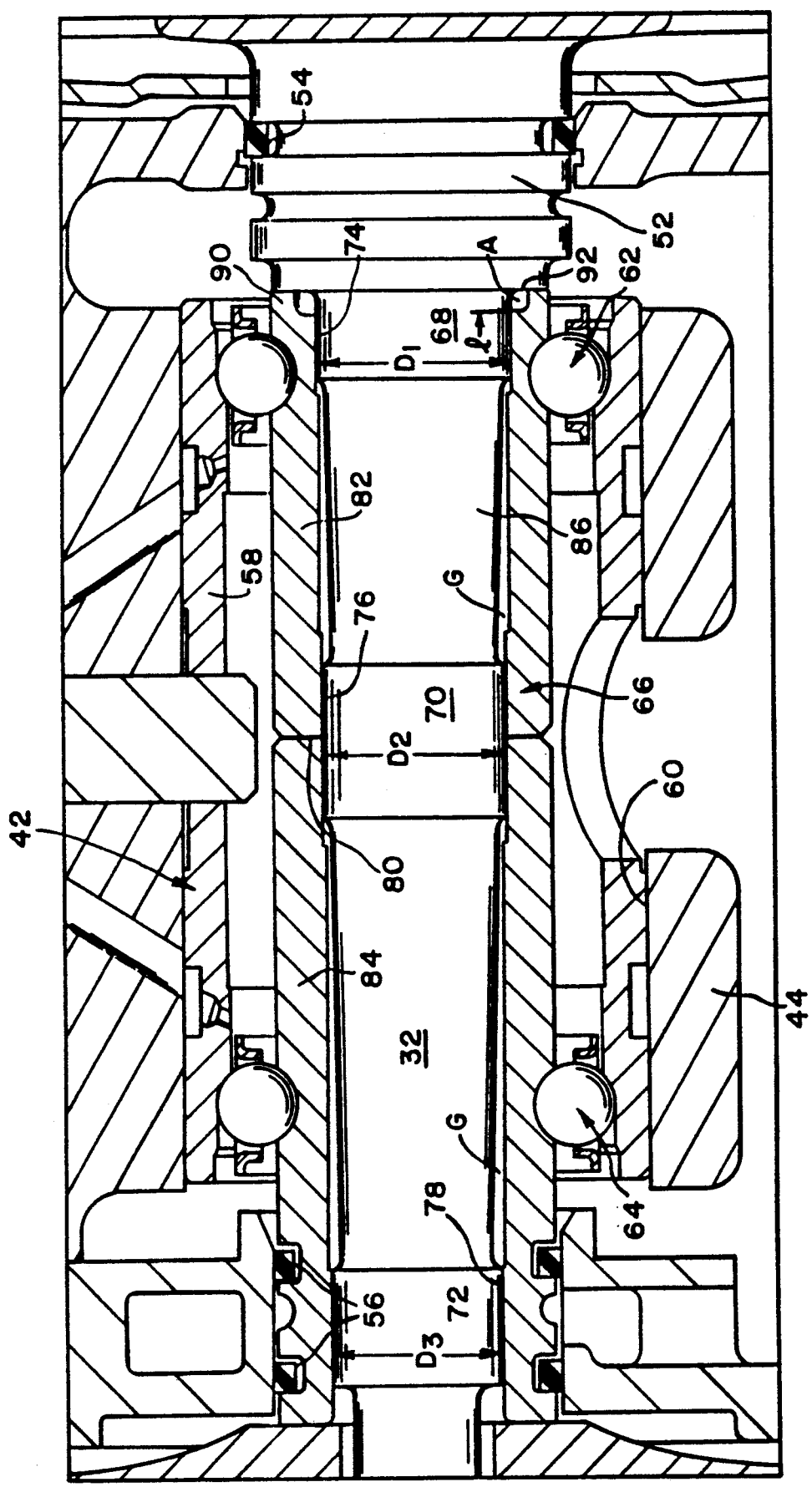

These and other advantages of the invention will become apparent from the following description, with reference to the accompanying drawings, in which FIG. 1 is a cross-sectional view of an exhaust gas driven turbocharger with a bearing assembly made pursuant to the teachings of the present invention; and FIG. 2 is an enlarged view of the circumscribed portion of FIG. 1.

Referring now to the drawings, an exhaust gas driven turbocharger generally indicated by the numeral 10 includes a center housing 12, a turbine housing 14 secured to the center housing 12 by bolts 16, and a compressor housing 18 secured to the opposite end of the center housing 12 from the turbine housing 14 by retention ring 20. Compressor housing 18 includes an inlet 22, which is connected to a source of filtered ambient air, and an outlet volute 24 which is connected to the engine induction manifold. Turbine housing 14 includes an inlet volute 26, which is connected to the exhaust manifold of the engine upon which turbocharger 10 is used, and an outlet 28, which is connected to the vehicle exhaust system.

A turbine wheel 30 is mounted on one end of a shaft 32 extending into the turbine housing 14. Turbine wheel 30 includes turbine blades 34 through which exhaust gasses traveling from the volute 26 to the outlet 28 pass, thereby effecting rotation of the turbine wheel 30 and, accordingly, also effecting rotation of the shaft 32. A conventional shroud 36 is disposed between the turbine wheel 30 and the center housing 12 to inhibit heat transfer therebetween. A compressor wheel 38 is mounted within the compressor housing 18 on the end of the shaft 32 opposite the end upon which turbine wheel 30 is mounted. Compressor wheel 38 includes blades 40 through which air communicated to the inlet 22 is passed. Rotation of the compressor wheel 38 compresses air and directs it into the outlet volute 24.

A bearing cartridge generally indicated by the numeral 42 rotatably mounts the shaft 32 within bearing carrier 44, which is a part of the center housing 12. Center housing 12 also includes appropriate coolant passages 46 which carry engine coolant into the center housing 12, and also include oil inlet passages 48 and oil drain passage 50, which carry lubricating oil to the bearing assembly 42. The shaft 32 includes an enlarged diameter portion or hub 52 adjacent the end of the shaft 32 upon which the turbine wheel 30 is mounted. Hub 52 carries turbine seal 54. Seals 56 are provided to prevent leakage into the compressor housing 18.

Referring now to FIG. 2, bearing assembly 42 includes a bearing outer ring 58 which is received within bore 60 of bearing carrier 44. Bearing outer ring 58 is a rigid, uninterrupted member which provides a structural link between a first set of circumferentially spaced, conventional, ball bearing elements 62 and a second set of circumferentially spaced, rigid, ball bearing elements 64. Ball bearing elements 62, 64 are conventional, and rotatably support bearing inner ring 66 on the bearing outer ring 58. As will be seen, bearing inner ring 66 rotates with the shaft 32 during operation of the turbocharger. The bearing element 62, 64 are conventional ball bearing elements of a type well known to those skilled in the art.

The shaft 32 is provided with faying surfaces 68, 70, 72 which engage corresponding faying surfaces 74, 76 and 78 on the bearing inner ring 66 with a light press fit to achieve high radial stiffness between the bearing inner ring 66 and the shaft 32. The faying surfaces are precisely machined to a smooth finish to achieve light press fit between the faying surfaces 68, 70, 72 on the shaft and the faying surfaces 74, 76 and 78 on the bearing inner ring 66. It will be noted that the bearing inner ring 66 is split as at 80 into sections 82, 84, so that the faying surface 76 on the inner ring 66 is split between the sections 80, 84, but the faying surface 76 on both sections of the bearing inner ring 66 engage the faying surface 70 on the shaft 32. Shaft 32 also defines portions 86, 88 between the faying surfaces 68, 70, 72. These intermediate sections 86, 88 cooperate with the inner ring 66 to define small, circumferentially extending air gaps G, which acts as a heat insulator to retard heat transfer between the relatively hot shaft 32, which will be heated to very near the temperature of the turbine wheel 30, and the bearing inner ring 66. The diameter D1 of the faying surfaces 68, 74 is greater than the diameter D2 of the faying surfaces 70, 76, which is in turn greater than the diameter D3 of the faying surfaces 72, 78. Accordingly, when the bearing inner ring 66 is installed on the shaft 70, the faying surface 74 of the inner ring 66, because of the increased clearance, easily passes over diameters D2 and D3, and does not meet resistance until the faying diameter 74 is installed on faying diameter 68. Similarly, faying diameter 76 easily passes over faying diameter 72, to facilitate installation of the faying diameter 76 onto the faying surface 70 of the shaft 32.

The end of the inner ring 66 is Provided with a circumferentially extending, axially projecting portion 90, which engages circumferentially extending, radially projecting surface 92 defined between the hub 52 and the shaft 32. The projection 90 is formed by counterboring the end of the inner ring 66, so that an air gap A is provided between the projecting portion 90 and the shaft 32. Accordingly, the area of contact between the projecting portion 90 and the face 92 is minimized.

The hub 52, being immediately adjacent the turbine wheel 30, is the portion of the shaft 32 which is heated to the highest temperature. Accordingly, it is desirable to minimize the area of contact between the projecting portion 90 and the face 92 to restrict heat transfer by conduction from the shaft 32 into the inner ring 66 as much as possible, but this area of contact must be sufficiently large that the end of the inner ring 66 engages the hub 50 sufficiently to locate the inner ring 66 axially with respect to the shaft 32 so that bending moments applied to the shaft by dynamic forces exerted by the wheels are prevented. This area of contact can be closely controlled by counterboring the end of the inner ring 66.

Furthermore, the distance 1, which is the area of contact between faying diameter 68 and faying diameter 74, must also be closely controlled. Since this faying surface is closest to the hub 52, the portion of the shaft 32 carrying the faying surface 68 will be heated to a higher temperature than the portions of the shaft carrying the faying surfaces 70 or 72. Accordingly, in order to minimize heat transfer by conduction from the shaft to the bearing assembly, it is desirable to make the length of contact 1 between faying surfaces 68, 74 as short as possible. However, the distance 1 must be sufficiently long to provide sufficient radial stiffness to the assembly. Accordingly, the length of the faying diameter 68 may be closely controlled when the shaft 32 as manufactured by, for example, using a surface grinding process. Accordingly, the length of the faying surface 74, which being an internal dimension the length of which is relatively difficult to control, is no longer a critical dimension. Accordingly, the faying surface 74 may be machined by counterboring the end of the inner ring 66 and then finish grinding.

It should be noted that the inner ring 66 is split at 80 only to facilitate manufacture and assembly onto the shaft 32. It is, of course, possible to manufacture inner ring 66 in one piece, eliminating the split at 80. Accordingly, the faying surfaces 70, 76 are no longer necessary and may be eliminated. Accordingly, if an inner ring 66 comprising a single piece is used, only the faying surfaces at 68, 74 and 72, 78 are necessary.

I claim:

1. Exhaust gas driven turbocharger comprising a housing, a shaft within said housing having a pair of ends, a compressor wheel mounted within said housing on one end of the shaft for rotation therewith, a turbine wheel mounted within said housing on the other end of the shaft for rotation therewith, means for communicating air through said compressor wheel, means for communicating exhaust gas through the turbine wheel to cause the latter to rotate the shaft and the compressor wheel mounted thereon to compress the air communicated through the compressor wheel, and bearing means mounting said shaft for rotation relative to the housing, said bearing means including a bearing outer ring, a bearing inner ring, and ball bearing elements supporting the bearing outer ring on the bearing inner ring, said ball bearing elements includes a first set of said elements and a second set of said elements spaced axially from said first set, said bearing outer ring being a rigid, uninterrupted member providing an uninterrupted structural link between said first and second sets to establish the axial spacing between said sets, a pair of axially spaced faying surfaces on said inner ring engaging corresponding faying surfaces on said shaft to support said inner ring on said shaft, said shaft defining a circumferentially extending surface between the faying surfaces on said inner ring cooperating with said shaft to define an air gap therebetween, one of the faying surfaces on said inner ring having a diameter greater than the diameter of the other of said faying surfaces on said inner ring.

2. Exhaust gas driven turbocharger as claimed in claim 1, wherein said shaft includes a radially projecting hub, one end of the inner ring defining a radially extending engagement surface for engagement with the hub to thereby locate said inner ring axially with respect to said shaft.

3. Exhaust gas driven turbocharger as claimed in claim 2, wherein one of said axially spaced faying surfaces on said shaft is located between said hub and the other faying surface, the diameter of said one faying surface being greater than the diameter of the other faying surface.

4. Exhaust gas driven turbocharger as claimed in claim 2, wherein said radially extending engagement surface is defined on a circumferentially extending, axially projecting portion of said inner ring, said projecting portion of said inner ring cooperating with said shaft to define a circumferentially extending air gap therebetween.

5. Exhaust gas driven turbocharger as claimed in claim 1, wherein said bearing means includes a third faying surface on said inner ring between said pair of faying surfaces and a corresponding faying surface on said shaft.

6. Exhaust gas driven turbocharger as claimed in claim 5, wherein said inner ring is split at said third faying surface into a pair of sections, each of said sections carrying a portion of the third faying surface and each portion of said third faying surface engaging said corresponding faying surface on said shaft.

7. Exhaust gas driven turbocharger as claimed in claim 6, wherein the diameter of one of said pair of faying surfaces is greater than the diameter of the other of said pair of faying surfaces, the diameter of said third faying surface being greater than the diameter of said other faying surface but less than the diameter of said one faying surface.

8. Exhaust gas driven turbocharger as claimed in claim 7, wherein said shaft and said inner ring include cooperating means for locating one end of said inner ring axially with respect to said shaft, said one faying surface being adjacent said one end of said inner ring.

9. Exhaust gas driven turbocharger as claimed in claim 1, wherein said faying surfaces engage axially spaced portions of said shaft and said inner ring, one of said set of elements being adjacent one end of said inner ring, the other set of elements being located between said one set of elements and the other end of the inner ring, one of said faying surfaces being located adjacent said one end of said inner ring, the diameter of said one faying surface being greater than the diameter of the other faying surface.

* * * * *